(12) United States Patent
Tsugawa

(10) Patent No.: US 11,831,978 B2
(45) Date of Patent: Nov. 28, 2023

(54) RECORDING APPARATUS, CONTROL METHOD THEREOF, AND STORAGE MEDIUM

(71) Applicant: CANON KABUSHIKI KAISHA, Tokyo (JP)

(72) Inventor: Hiroshige Tsugawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/851,526

(22) Filed: Jun. 28, 2022

(65) Prior Publication Data

US 2022/0417445 A1 Dec. 29, 2022

(30) Foreign Application Priority Data

Jun. 29, 2021 (JP) .................................. 2021-108054

(51) Int. Cl.
*H04N 23/63* (2023.01)
*H04N 5/907* (2006.01)
*H04N 23/62* (2023.01)

(52) U.S. Cl.
CPC ........... *H04N 23/632* (2023.01); *H04N 5/907* (2013.01); *H04N 23/62* (2023.01)

(58) Field of Classification Search
CPC ...... H04N 23/632; H04N 5/907; H04N 23/60; H04N 23/62; H04N 9/8205
USPC ........................................................ 348/241
See application file for complete search history.

(56) References Cited

U.S. PATENT DOCUMENTS

| | | | | |
|---|---|---|---|---|
| 7,885,511 B2* | 2/2011 | Tsukui | ................. | G11B 19/027 348/222.1 |
| 8,204,919 B2* | 6/2012 | Oka | ....................... | G11B 20/10 382/302 |
| 8,417,089 B2* | 4/2013 | Mori | ...................... | H04N 5/772 386/224 |
| 9,195,742 B2* | 11/2015 | Yoneda | ................. | G11B 27/105 |
| 10,127,942 B2* | 11/2018 | Yoneda | ................. | G11B 19/26 |
| 11,398,252 B2* | 7/2022 | Mizutani | ................ | G11B 27/10 |

(Continued)

FOREIGN PATENT DOCUMENTS

| | | |
|---|---|---|
| JP | 2000113591 A | 4/2000 |
| JP | 2007142728 A | 6/2007 |

(Continued)

*Primary Examiner* — Pritham D Prabhakher
(74) *Attorney, Agent, or Firm* — Canon U.S.A., Inc. IP Division

(57) ABSTRACT

A recording apparatus includes a control unit configured to set the input additional information as recording additional information to be recorded together with a moving-image file, in response to input of the additional information, and a recording control unit configured to record moving-image data in a recording medium as the moving-image file, and record an additional information file including the recording additional information set by the control unit in the recording medium, in association with the moving-image file, wherein, in a case where the additional information is input by an input unit during recording of the moving-image file in the recording medium, the control unit sets the input additional information as the recording additional information at end of recording of the moving-image file, without setting the input additional information as the recording additional information in response to the input of the additional information by the input unit.

20 Claims, 8 Drawing Sheets

(56) References Cited

U.S. PATENT DOCUMENTS

| | | | | |
|---|---|---|---|---|
| 11,665,312 B1* | 5/2023 | Brandt | ............... | G11B 27/031 |
| | | | | 715/725 |
| 2005/0008327 A1* | 1/2005 | Shinkai | ............... | H04N 9/8227 |
| | | | | 386/E9.04 |
| 2006/0209191 A1* | 9/2006 | Tsukui | ............... | H04N 5/772 |
| | | | | 348/207.99 |
| 2012/0051715 A1* | 3/2012 | Mori | ............... | H04N 5/772 |
| | | | | 386/230 |
| 2012/0082425 A1* | 4/2012 | Kishikawa | ............... | G11B 27/034 |
| | | | | 386/E5.069 |
| 2013/0188920 A1* | 7/2013 | Mori | ............... | H04N 9/79 |
| | | | | 386/224 |
| 2014/0193138 A1* | 7/2014 | Koren | ............... | G11B 27/031 |
| | | | | 386/281 |
| 2014/0355956 A1* | 12/2014 | Yoneda | ............... | G06F 16/51 |
| | | | | 386/248 |
| 2016/0241864 A1* | 8/2016 | Loyd | ............... | H04N 21/4524 |
| 2017/0270960 A1* | 9/2017 | Yoneda | ............... | G11B 20/18 |
| 2021/0174090 A1* | 6/2021 | Fujikawa | ............... | H04N 5/77 |

FOREIGN PATENT DOCUMENTS

| | | | |
|---|---|---|---|
| JP | 2010288160 A | 12/2010 | |
| JP | 2013098658 A | 5/2013 | |
| JP | 2013098659 A | 5/2013 | |
| JP | 2017050801 A | 3/2017 | |

\* cited by examiner

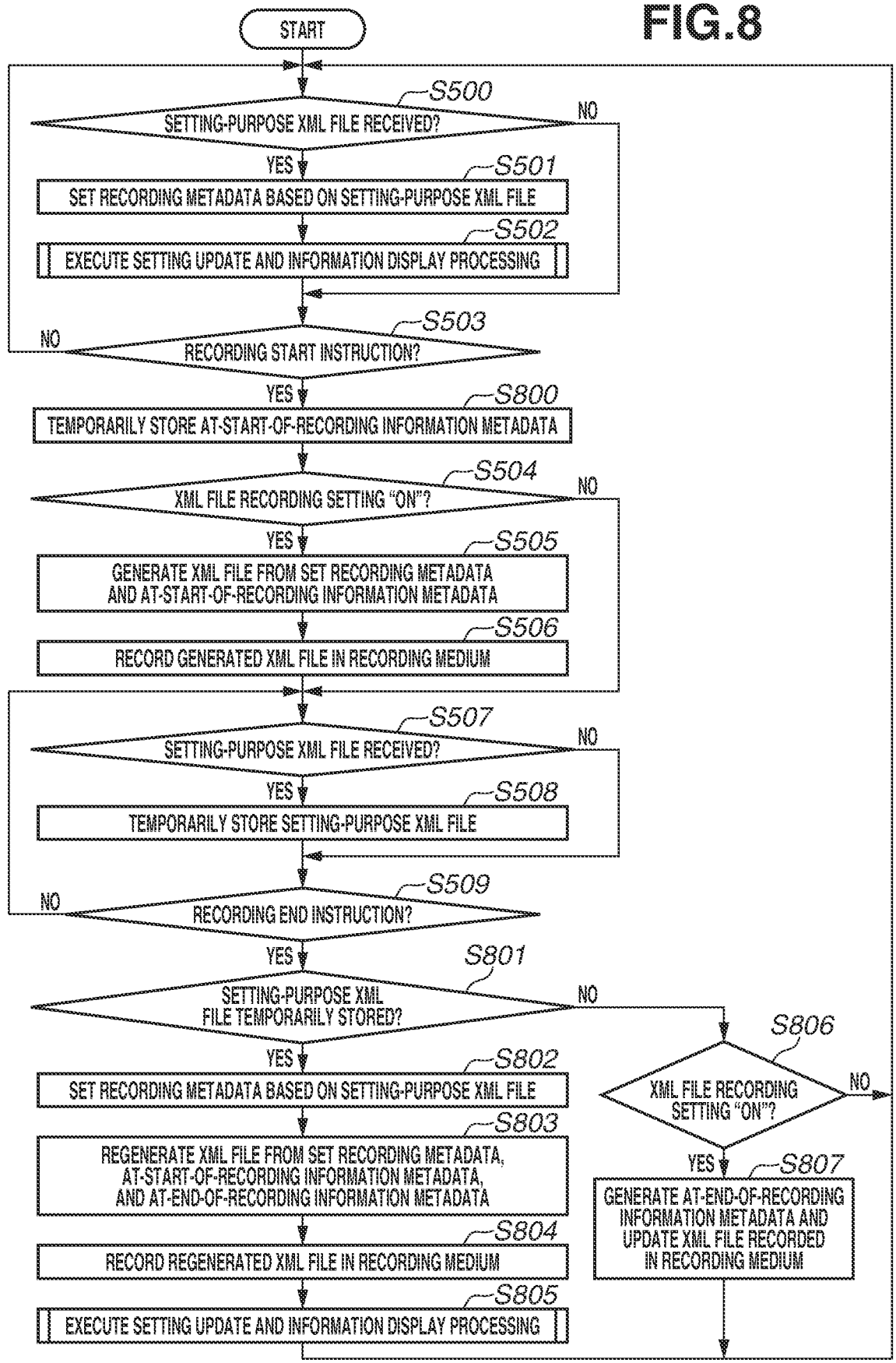

RECORDING APPARATUS, CONTROL METHOD THEREOF, AND STORAGE MEDIUM

BACKGROUND OF THE INVENTION

Field of the Invention

The present invention relates to a recording apparatus that records an additional information file related to a moving-image file in a recording medium.

Description of the Related Art

In recent years, because of the rise of social networking services (SNSs) such as Twitter, the press such as broadcast stations and news agencies has been expected to convey more accurate information more quickly at reporting scenes than ever before. Therefore, in image processing apparatuses such as a digital still camera and a digital video camera, not only a moving-image file but also an additional information file in which various kinds of metadata about the moving-image file is written are utilized, so that news to be flashed is sent more quickly and more easily. For example, together with a captured moving image, metadata such as the format and the record length of the moving image can be recorded in the additional information file. In addition, coverage information such as a coverage title and a coverage place can be written in the additional information file at a reporting scene, by communication between a mobile terminal and a digital video camera. For example, the additional information file is used as information to search for a desired moving-image file in a moving-image file server more easily. In the search, it is possible to know the format and the record length of the moving-image file by viewing various kinds of metadata of the moving-image file.

Japanese Patent Application Laid-Open No. 2013-98658 discusses a technique in which when a user inputs the content of an additional information file to be associated with a moving image into a communication device, the content is prevented from being recorded in association with a wrong moving image file.

Metadata (additional information) to be recorded in an additional information file in association with a moving-image file includes not only additional information set by a user, but also additional information to be updated at the start of recording and additional information to be updated at the end of recording. Therefore, if the additional information file being recorded is updated in response to the input of additional information to be recorded during recording of the moving-image file, the additional information recorded at the start of recording can be overwritten, which can result in the additional information file lacking the additional information recorded at the start of recording.

In addition, during recording of the moving-image file, recording of moving-image data in a recording medium is performed. Therefore, if the additional information file is updated during recording of the moving-image data, processing for recording in the recording medium can be complicated, and the speed of recording the moving-image data can also be affected.

SUMMARY OF THE INVENTION

The present invention is directed to providing a recording apparatus that appropriately responds to input additional information at appropriate timing, even in a case where the additional information is input during recording of a moving-image file.

According to an aspect of the present invention, there is provided a recording apparatus including an input unit configured to input additional information, a control unit configured to set the input additional information as recording additional information to be recorded together with a moving-image file, in response to input of the additional information by the input unit, and a recording control unit configured to record moving-image data in a recording medium as the moving-image file, and record an additional information file including the recording additional information set by the control unit in the recording medium, in association with the moving-image file, wherein, in a case where the additional information is input by the input unit during recording of the moving-image file in the recording medium, the control unit sets the input additional information as the recording additional information at end of recording of the moving-image file, without setting the input additional information as the recording additional information in response to the input of the additional information by the input unit.

Further features of the present invention will become apparent from the following description of exemplary embodiments with reference to the attached drawings.

BRIEF DESCRIPTION OF THE DRAWINGS

FIG. 8 is a flowchart of XML file recording processing according to a second exemplary embodiment.

DESCRIPTION OF THE EMBODIMENTS

Figure 1:
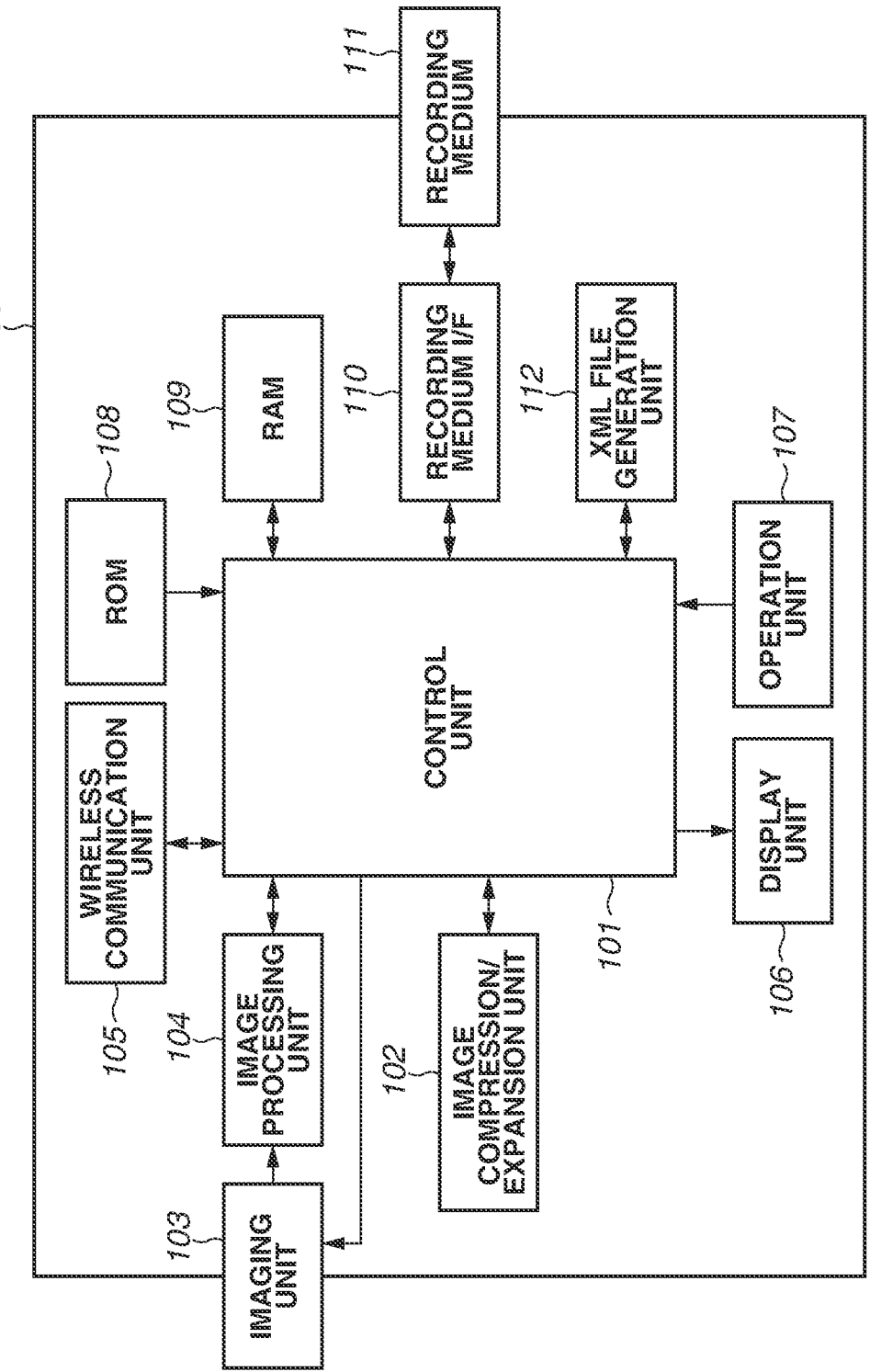
FIG. 1 is a block diagram illustrating a digital video camera.

FIG. 1 illustrates a digital video camera 100 according to a first exemplary embodiment, as an example of a video image recording apparatus to which the present invention can be applied.

In FIG. 1, components connected to a control unit 101 are an image compression/expansion unit 102, an imaging unit 103, an image processing unit 104, a wireless communication unit 105, a display unit 106, an operation unit 107, a read only memory (ROM) 108, a random access memory (RAM) 109, a recording medium interface ON) 110, and an Extensible Markup Language (XML) file generation unit 112. The control unit 101 and each of these components can exchange data.

The control unit 101 is a system control unit such as a central processing unit (CPU) that controls the entire system of the digital video camera 100. The control unit 101 loads a program stored in the ROM 108 into the RAM 109 and executes the loaded program, thereby performing control for each of the components and calculation processing, and executing flowcharts to be described. The ROM 108 is a nonvolatile recording medium, and stores the program to be executed by the control unit 101 and various settings. The RAM 109 is a volatile recording medium used as a work memory of the control unit 101. The RAM 109 is also used as a video-RAM (VRAM) that temporarily stores image data acquired by the imaging unit 103 and processed by the image processing unit 104, or image data read out from a recording medium 111, in order to subject the image data to compression processing or expansion processing in the image compression/expansion unit 102, or to display the image data on the display unit 106. The RAM 109 is also used as a RAM that temporarily stores an XML file to be recorded in association with a captured image and metadata to be written in the XML file. The XML file to be recorded can be received from the wireless communication unit 105. The control unit 101 also performs generation of display data, control of display timing, and the like for the display unit 106, and thus also functions as a display control unit. Further, the control unit 101 also controls recording, readout, and the like of data with respect to the recording medium 111 via the recording medium I/F 110, and thus also functions as a recording control unit. The control unit 101 may be configured of a plurality of processors, or may be configured integrally with the other component (e.g., the image compression/expansion unit 102, or the image processing unit 104) by having the function of the component, or may have part of the function of the other component.

The recording medium 111 for recording image data can be attached to the digital video camera 100. Therefore, the digital video camera 100 has the recording medium I/F 110. The recording medium I/F 110 has a slot into which the detachable recording medium 111 such as a memory card can be inserted. FIG. 1 illustrates an example in which the recording medium 111 is attached to the recording medium I/F 110. The digital video camera 100 is described to have the configuration in which image data is recorded in the detachable recording medium 111, but may have a configuration in which image data is recorded in an undetachable recording medium built in the digital video camera 100.

The image processing unit 104 subjects image data acquired by the imaging unit 103 to predetermined processing including pixel interpolation, resizing processing, and color conversion processing. Further, the image processing unit 104 performs predetermined calculation processing using the acquired image data, and the control unit 101 performs various types of control (such as exposure control, and automatic white balance control) related to imaging by the imaging unit 103, based on the obtained calculation result.

The image compression/expansion unit 102 performs processing for compressing image data subjected to the image processing by the image processing unit 104, and processing fir expanding image data read out from the recording medium 111.

The imaging unit 103 has an imaging lens (including a zoom lens and a focus lens) and an image sensor, images a subject based on control by the control unit 101, and acquires image data such as still-image data or moving-image data.

The display unit 106 is a display for displaying various setting states, an image captured by the imaging unit 103, an image read out from a recording medium and played back, and the like, based on control by the control unit 101. The display unit 106 is configured as a display inside a look-through finder, a vari-angle liquid crystal display (LCD) monitor, or the like.

The operation unit 107 includes a power switch for supplying power to the digital video camera 100, an image-capturing start button, and a mode switching button for enabling switching to a camera mode (an image capturing mode) and a playback mode, and accepts operations from a user. In a case where a touch panel is included in the operation unit 107, the control unit 101 can detect an operation on the touch panel. For the touch panel, any of various types of touch panel may be used, including a resistive film type, an electrostatic capacitance type, a surface elastic wave type, an infrared ray type, an electromagnetic induction type, an image recognition type, and an optical sensor type.

The wireless communication unit 105 transmits and receives data to and from an external apparatus such as an external camera, a personal computer, a smartphone, or a tablet by wireless communication, based on control by the control unit 101. The wireless communication unit 105 makes it possible to transmit information such as setting information and operation information of the digital video camera 100 to the external apparatus, and to receive a command for operating the digital video camera 100, an XML file to be recorded together with image data, and the like from the external apparatus. The received data is stored in the RAM 109. The data that can be transmitted and received includes digital image data and analog video signals.

The XML file generation unit 112 generates an XML file to be recorded in association with a captured image (a moving-image file), based on control by the control unit 101. The XML file is generated using metadata (additional information) included in an XML file received by the wireless communication unit 105 from the external apparatus or an XML file recorded in the recording medium 111, and metadata that can be acquired at the start of recording or at the completion of recording. The details of a metadata configuration included in the XML file will be described with reference to FIG. 2.

Figure 3:
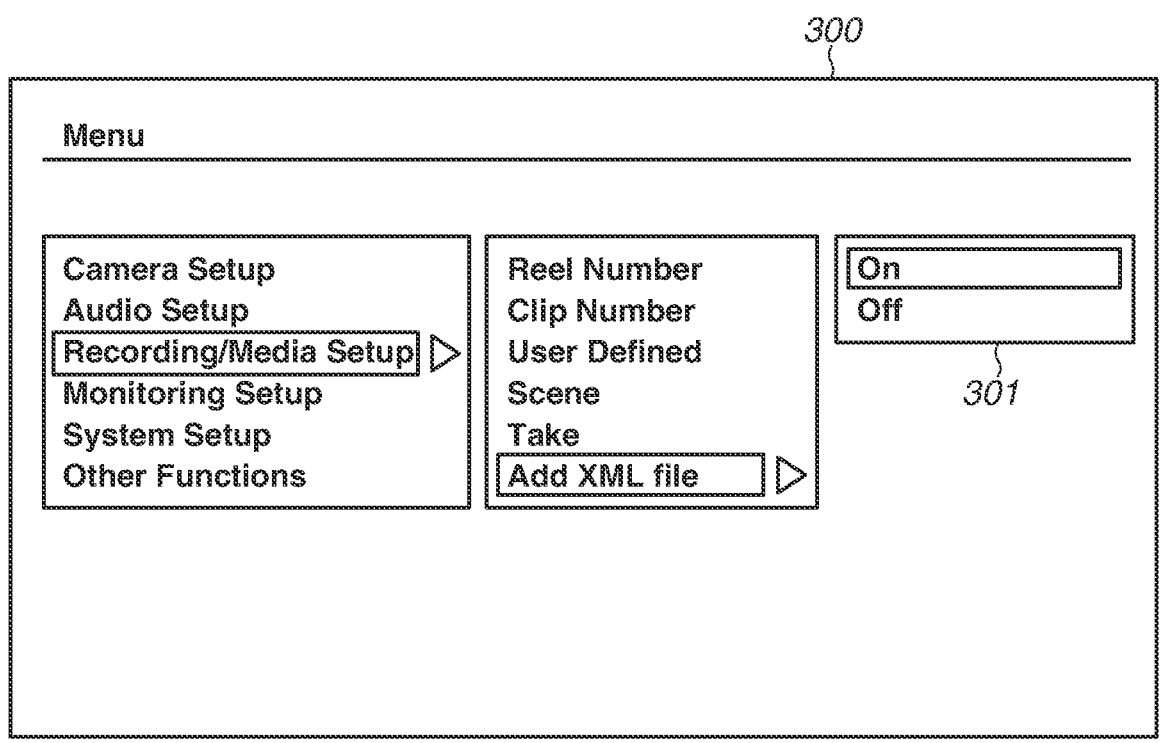
FIG. 3 illustrates a display example of a menu screen for selecting on/off of XML file recording.

The control unit 101 displays a menu 300 illustrated in FIG. 3 on the display unit 106, in response to an operation on a menu button included in the operation unit 107. The user can select "On" or "Off" as an XML file recording setting indicating whether to record an XML file among items of the menu 300, by operating a selection cursor 301 using a cross key included in the operation unit 107. The control unit 101 stores the XML file recording setting selected by the user in the RAM 109 or the ROM 108. Further, concerning the format of the XML file to be recorded in association with the moving-image file, the user can select an XML file format from a menu 400 illustrated in FIG. 4, using a selection cursor 101, as in the menu 300, in the menu 100, the user can select between "News Metadata" and "Original" as an XML file format setting. An XML file in a NewsML-G2 format is recorded in a case where "News Metadata" is selected, and an XML file in user memo format is recorded in a case where "Original" is selected. The control unit 101 also stores the XML file format setting selected in the menu 100, in the RAM 109 or the ROM 108.

Figure 2:
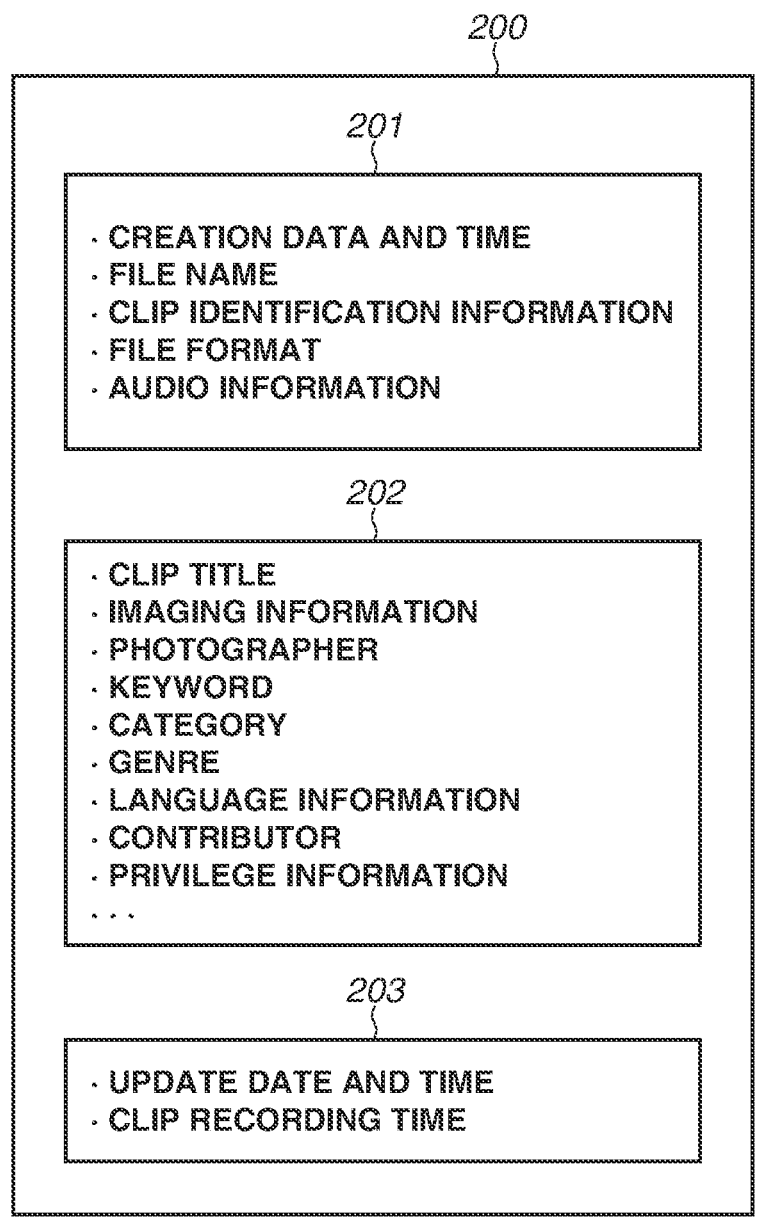
FIG. 2 illustrates an example of an Extensible Markup Language (XML) file format.

FIG. 2 illustrates an example of the metadata (additional information) configuration included in the XML file to be recorded in association with the moving-image file in the present exemplary embodiment. An XML file 200 is composed of metadata 201 to be recorded based on information acquired at the start of recording, metadata 202 set by the user, and metadata 203 to be recorded based on information acquired at the end of recording. The metadata 201 has information determined at the start of recording of the moving-image file (moving-image data), and this is additional information not to be changed after the start of recording. The information includes a creation date and time, a file name, clip identification information, a file format, and audio information. The metadata 202 has information that is additional information set by the user, and the information includes a clip title, imaging information, a photographer, a keyword, a category, a genre, language information, a contributor, and privilege information. The metadata 203 has information that is additional information determined at the end of recording of the moving-image data of the moving-image file, and the information cannot be acquired at the start of recording of the moving-image data, and includes an update date and time, and a clip record length (such as the recording time or the number of frames).

Because the metadata 202 has the additional information set by the user, it is desirable to input the metadata 202 into the digital video camera 100. In the present exemplary embodiment, the user sets the metadata 202 in the external apparatus, and the external apparatus generates a setting-purpose XML file including the metadata 202 set in the external apparatus, and inputs the generated setting-purpose XML file into the digital video camera 100. The setting-purpose XML file generated in the external apparatus can be input into the digital video camera 100 via the wireless communication unit 105 or the recording medium 111. In a case where the setting-purpose XML file is input into the digital video camera 100 via the wireless communication unit 105, the user sets the metadata 202 in the external apparatus, and provides the external apparatus with a transmission instruction to transmit the set metadata 202 to the digital video camera 100. The external apparatus generates the setting-purpose XML file including the metadata 202 set by the user and transmits the generated setting-purpose XML file to the digital video camera 100, in response to the transmission instruction. The wireless communication unit 105 of the digital video camera 100 receives the setting-purpose XML file transmitted from the external apparatus, so that the digital video camera 100 acquires the metadata 202 set in the external apparatus by the user. In a case where the setting-purpose XML file is input into the digital video camera 100 via the recording medium 111, the setting-purpose XML file describing the metadata 202 in the external apparatus is recorded in the recording medium 111. The user attaches the recording medium 111 in which the setting-purpose XML file is recorded, to the recording medium I/F 110 of the digital video camera 100. Subsequently, the setting-purpose XML file is read out by the recording medium I/F 110, so that the digital video camera 100 can acquire the metadata 202 set in the external apparatus by the user. The setting-purpose XML file is read out from the recording medium 111 and the metadata 202 is acquired, when the use of the metadata of the setting-purpose XML file recorded in the recording medium 111 is set by a user operation on the operation unit 107 of the digital video camera 100. In the digital video camera 100 of the present exemplary embodiment, the use of the setting-purpose XML file in the recording medium 111 cannot be set during recording of the moving-image file, but the setting of recording metadata can be updated by receiving the setting-purpose XML file from the external apparatus.

The setting-purpose XML file generated by the external apparatus includes at least the information of the metadata 202 set by the user. Alternatively, the external apparatus may describe the metadata in the format identical to that of the XML file to be generated to be recorded together with the moving-image file by the digital video camera 100. In that case, the metadata 201 and the metadata 203 cannot be determined by the external apparatus and thus have blanks or values such as 0.

As described above, when the digital video camera 100 acquires the setting-purpose XML file, the control unit 101 sets the metadata included in the setting-purpose XML file, as the recording metadata (recording additional information). Further, the set recording metadata is stored in the ROM 108 or the RAM 109. When the XML file is recorded in association with the moving-image file, the metadata set as the recording metadata is recorded as the metadata of the XML file. The recording metadata is set for each XML file format. In other words, in the present exemplary embodiment, the recording metadata in the NewsML-G2 format and the recording metadata in the user memo format can each be set. Therefore, the control unit 101 switches between setting of the recording metadata in the NewsML-G2 format and setting of the recording metadata in the user memo format, depending on whether the format of the setting-purpose XML file input into the digital video camera is the NewsML-G2 format or the user memo format.

Figure 5:
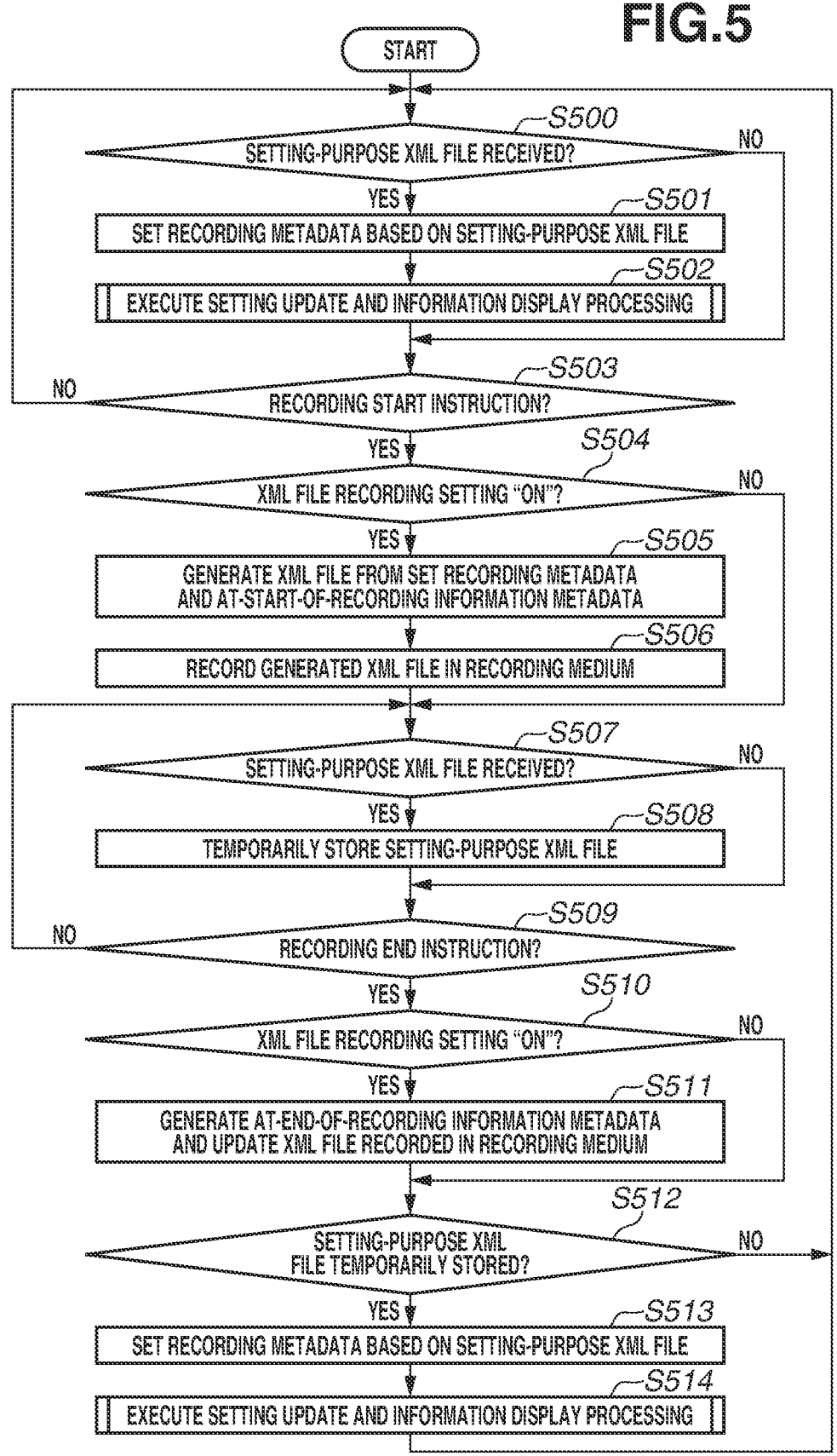
FIG. 5 is a flowchart of XML file recording processing according to a first exemplary embodiment.
Figure 6:
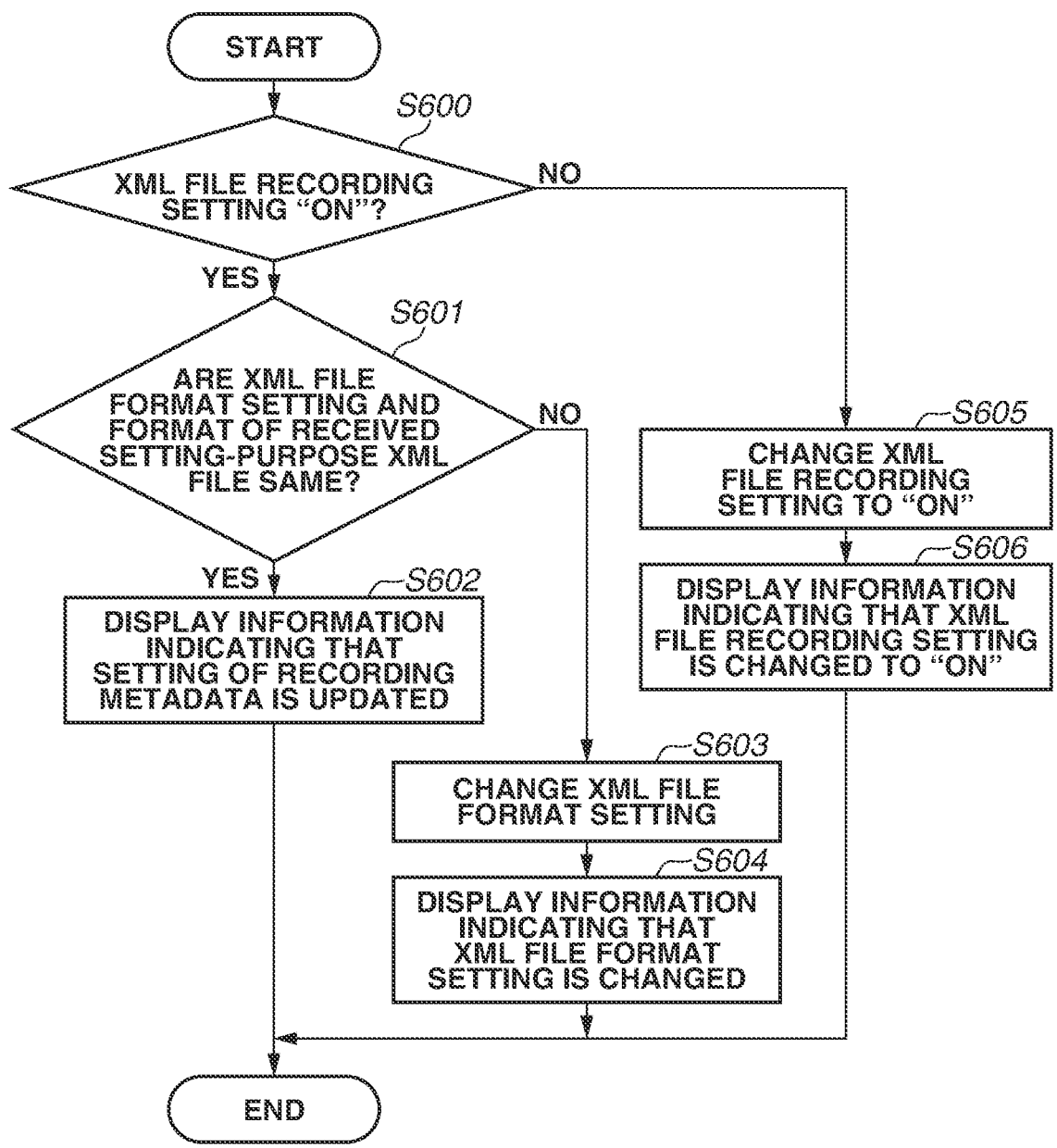
FIG. 6 is a flowchart of setting update and information display processing.

Next, processing about recording and setting of the XML file in the present exemplary embodiment will be described with reference to FIGS. 5 and 6. The control unit 101 reads out the program stored in the ROM 108 and loads the read-out program into the RAM 109, thereby executing control for each of the components and the calculation processing, so that each step of a flowchart in each of FIGS. 5 and 6 is implemented. In a case where the digital video camera 100 is set to the camera mode (the image capturing mode) by an operation on the operation unit 107 by the user, the control unit 101 starts the processing in FIG. 5.

FIG. 5 is a flowchart illustrating an XML file recording processing procedure in the digital video camera 100 in the first exemplary embodiment.

Figure 4:
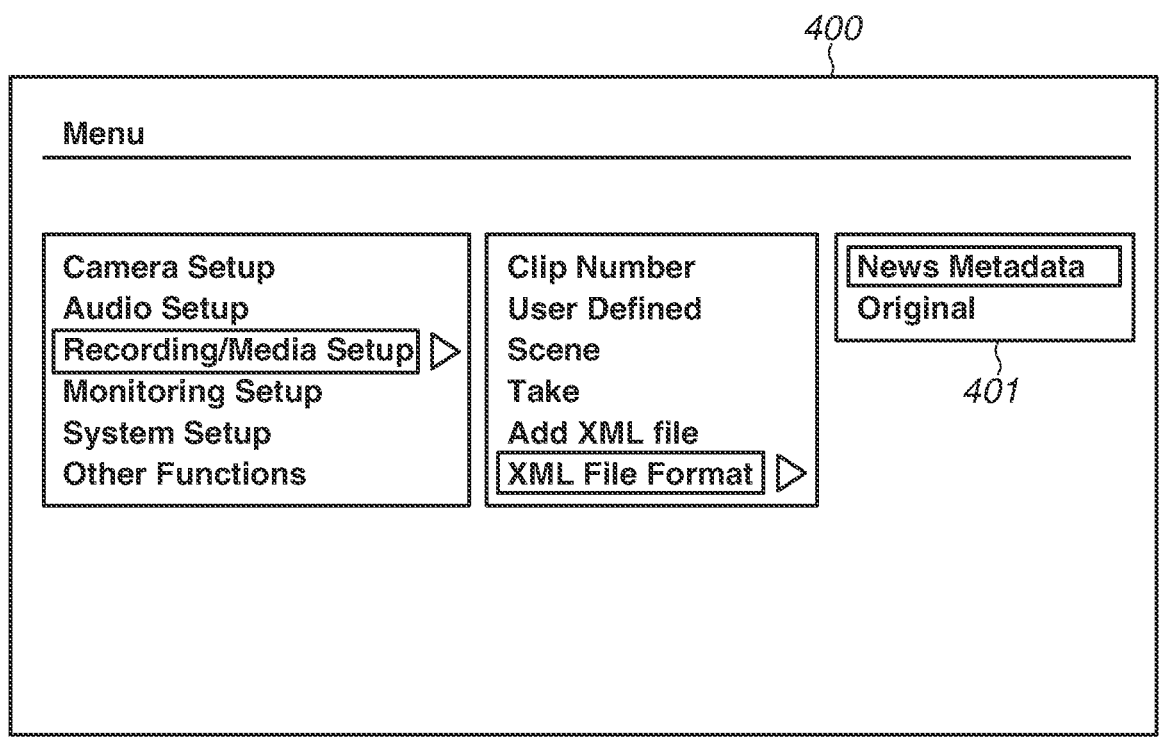
FIG. 4 illustrates a display example of a menu screen for selecting a format of XML file recording.

Upon setting to the camera mode, at first, the control unit 101 reads out settings selected by the user in the menus in FIG. 3 and FIG. 4, from the ROM 108. Subsequently, in a case where the XML file recording setting is "On", the control unit 101 reads out recording metadata corresponding to the XML file format setting selected by the user from the ROM 108, and stores the read-out recording metadata in the RAM 109. Afterward, the control unit 101 executes processing in and after step S500. In a case where the XML file recording setting, the XML file format setting, or the setting of the recording metadata is changed during the operation in the camera mode, the control unit 101 updates each setting recorded in the ROM 108, and the recording metadata stored in the RAM 109.

In step S500, the control unit 101 determines whether a setting-purpose XML file is received from the external apparatus via the wireless communication unit 105. If the control unit 101 determines that the setting-purpose XML file is received (YES in step S500), the processing proceeds to step S501. If the control unit 101 determines that the setting-purpose XML file is not received (NO in step S500), the processing proceeds to step S503. A moving-image file is not being recorded in step S500, and thus the control unit 101 may also determine whether the use of a setting-purpose XML file recorded in the recording medium 111 is set by an operation on the operation unit 107. In a case where the control unit 101 determines that the use of the setting-purpose XML file stored in the recording medium 111 is set by the user, the control unit 101 reads out the setting-purpose XML file from the recording medium 111 via the recording medium I/F 110, and the processing proceeds to step S501. In a case where the use of the setting-purpose XML file recorded in the recording medium 111 is not set, the processing proceeds to step S503.

In step S501, the XML file generation unit 112 analyzes the setting-purpose XML file received in step S500 (or the setting-purpose XML file read out from the recording medium 111 in step S500). Subsequently, metadata desirable for generation of an XML file to be recorded in association with a moving-image file is set as recording metadata, and the recording metadata is stored in the RAM 109. Because the metadata is set as the recording metadata and stored in the RAM 109, the metadata is to be recorded as metadata in the XML file to be recorded together with the moving-image file.

In step S502, the control unit 101 executes setting update and information display processing, which is composed of setting update processing accompanying setting change of recording metadata, and information display processing about setting change. The details of the processing will be described below with reference to FIG. 6.

In step S503, the control unit 101 determines whether a recording start instruction to start recording of the moving-image file is input by an operation performed on the operation unit 107 to give a moving-image recording start instruction. If the control unit 101 determines that the recording start instruction is input (YES in step S503), the processing proceeds to step S504. If the control unit 101 determines that the recording start instruction is not input (NO in step S503), the processing returns to step S500. In other words, step S501 and step S502 are repeated until the recording start instruction is input and the moving-image recording processing begins. Although not illustrated in this flowchart, the control unit 101 starts moving-image file recording processing, in response to the input of the recording start instruction. In the moving-image file recording processing, at first, the control unit 101 generates a moving-image file, stores the moving-image file in the recording medium 111, and records moving-image data acquired by the imaging unit 103 and subjected to various types of processing by the image processing unit 104 and the image compression/expansion unit 102, in the moving-image file. When a recording end instruction is input by an operation on the operation unit 107, the control unit 101 records moving-image data acquired before the input of the recording end instruction, in the moving-image file, and generates or updates the header of the moving-image file, thereby completing the moving-image file recording processing.

In step S504, the control unit 101 determines whether the XML file recording setting is "On". If the control unit 101 determines that the setting is "On" (YES in step S504), the processing proceeds to step S505. If the control unit 101 determines that the setting is not "On" (NO in step S504), the processing proceeds to step S507.

In step S505, the XML file generation unit 112 generates at-start-of-recording information metadata from information that can be acquired at the start of recording of the moving-image file (moving-image data). Subsequently, the XML file generation unit 112 generates an XML file, using the generated at-start-of-recording information metadata, and the recording metadata stored in the RAM 109. In other words, the XML file is generated using the at-start-of-recording information metadata as the metadata 201, and the recording metadata as the metadata 202, of the XML file 200 in FIG. 2. In this process, an XML file having a blank or 0 as each piece of information of the metadata 203 may be generated, or an XML file not including the metadata 203 may be generated.

In step S506, the control unit 101 records the XML file generated in step S505 in the recording medium 111, in association with the moving-image file, via the recording medium I/F 110.

In step S507, the control unit 101 determines whether a setting-purpose XML file is received in a manner similar to step S500. If the control unit 101 determines that the setting-purpose XML file is received (YES in step S507), the processing proceeds to step S508. If the control unit 101 determines that the setting-purpose XML file is not received (NO in step S507), the processing proceeds to step S509. The moving-image file (moving-image data) is being recorded in step S507, and thus whether the use of the setting-purpose XML file recorded in the recording medium 111 is set is not determined, unlike step S500.

In step S508, the setting-purpose XML file received in step S507 is temporarily stored in the RAM 109.

In step S509, the control unit 101 determines whether a recording end instruction to end recording of the moving-image file is input by an operation on the operation unit 107. If the control unit 101 determines that the recording end instruction is received (YES in step S509), the processing proceeds to step S510. If the control unit 101 determines that the recording end instruction is not received in step S509), the processing returns to step S507, and step S507 and step S508 are repeated until the recording end instruction is input.

In step S510, the control unit 101 determines whether the XML file recording setting is "On", in a manner similar to step S504. If the control unit 101 determines that the setting is "On" (YES in step S510), the processing proceeds to step S511. If the control unit 101 determines that the setting is not "On" (NO in step S510), the processing proceeds to step S512.

In step S511, the XML file generation unit 112 generates at-end-of-recording information metadata from information that can be acquired at the end of recording. Subsequently, the XML file recorded in the recording medium 111 in step S506 is read out, the metadata 203 in the XML file is updated with the at-end-of-recording information metadata, and the updated XML file is recorded in the recording medium 111. In a case where the metadata 203 is not recorded in the XML file, the at-end-of-recording information metadata is added as the metadata 203 and recorded in the recording medium 111. Each piece of information of the metadata 203 determined at the end of recording is not recorded in the XML file recorded in the recording medium 111 in step S506, and thus this is a state where information to be recorded is not included in the XML file. Therefore, an XML file describing each piece of information of the metadata 203 is generated, and the generated XML file is recorded in the recording medium 111 (overwriting) in step S511, which completes the recording of the XML file. Step S511 is executed at the timing when the at-end-of-recording information metadata can be generated, without waiting for the completion of recording of the moving-image file, i.e., at the timing when recording of the moving-image data is completed and information of a clip recording time can be acquired. Therefore, recording of the XML file can be completed before recording of the moving-image file is completed.

In step S512, the control unit 101 determines whether a setting-purpose XML file is temporarily stored in the RAM 109 by execution of step S508. If the control unit 101 determines that the setting-purpose XML file is stored (YES in step S512), the processing proceeds to step S513. If the control unit 101 determines that the setting-purpose XML file is not stored (NO in step S512), the processing returns to step S500.

In step S513, the XML file generation unit 112 analyzes the setting-purpose XML file temporarily stored in the RAM 109. Subsequently, metadata desirable for generation of an XML file to be recorded in association with the moving-image file is set as recording metadata, and the recording metadata is stored in the RAM 109. The recording metadata is to be used for generation of an XML file to be associated with a moving-image file to be recorded from next time.

Step S513 and step S514 are executed upon completion of recording of the moving-image file. In the present exemplary embodiment, even during recording of the moving-image file, the setting-purpose XML file can be received, but the setting of the recording metadata is changed upon completion of recording of the moving-image file. Therefore, in recording of a moving-image file from next time, the XML file including the recording metadata after the setting change is to be recorded together with the moving-image file.

In step S514, the control unit 101 executes the setting update and information display processing, which is composed of the setting update processing accompanying setting change of recording metadata, and the information display processing about setting change, in a manner similar to step S502.

The processing in FIG. 5 is repeated until the camera mode ends, or the digital video camera 100 is powered off.

FIG. 6 is a flowchart illustrating a procedure of the setting update and information display processing, which is composed of the setting update processing accompanying setting change of recording metadata, and the information display processing about setting change.

First, in step S600, the control unit 101 determines whether the XML file recording setting is "On". If the control unit 101 determines that the setting is "On" (YES in step S600), the processing proceeds to step S601. If the control unit 101 determines that the setting is not "On" (NO in step S600), the processing proceeds to step S605.

In step S601, the control unit 101 compares the XML file format setting and the format of the metadata described in the setting-purpose XML file received from the external apparatus before entering this processing, and determines whether these formats are the same. If the control unit 101 determines that the formats are the same (YES in step S601), the processing proceeds to step S602. If the control unit 101 determines that the formats are different (NO in step S601), the processing proceeds to step S603.

Figure 7A:
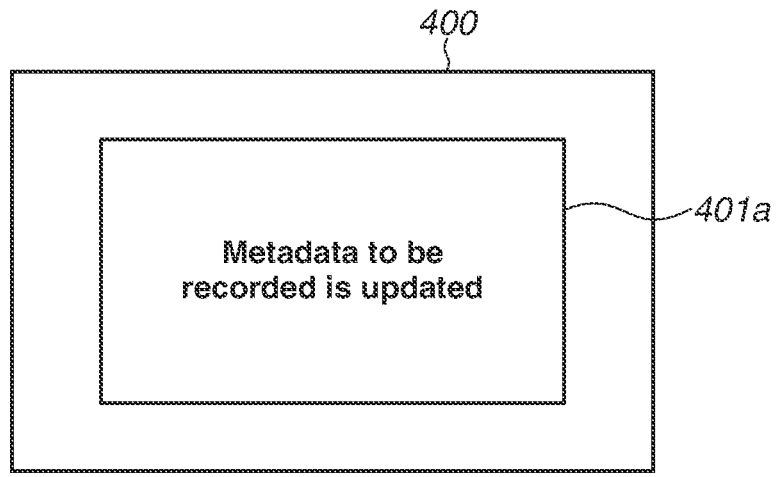
FIGS. 7A, 7B, and 7C each illustrate an example of display of notification information.

In step S602, because the recording metadata is set based on the setting-purpose XML file and the setting of the recording metadata is updated before entering this processing, the control unit 101 displays information for notifying the user that the setting of the recording metadata is updated on the display unit 106. For example, notification information 401a is displayed in a display screen 400 illustrated in FIG. 7A.

Figure 7B:
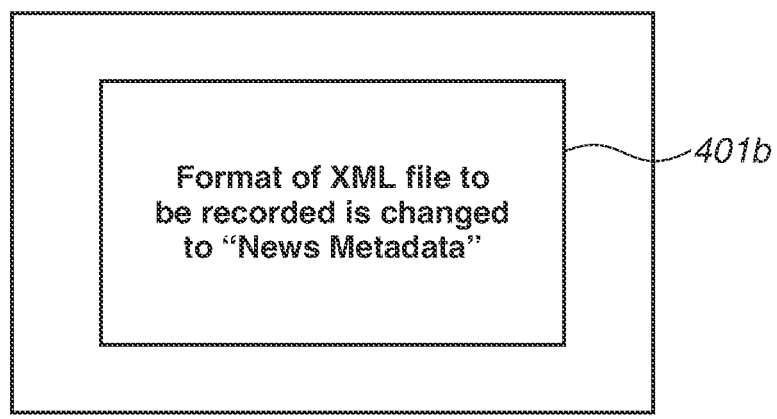

In step S603, the control unit 101 changes the XML file format setting to a format corresponding to the metadata included in the received setting-purpose XML file. Subsequently, in step S604, the control unit 101 displays information for notifying the user that the XML file format setting is changed on the display unit 106. For example, notification information 401b illustrated in FIG. 7B is displayed.

Figure 7C:
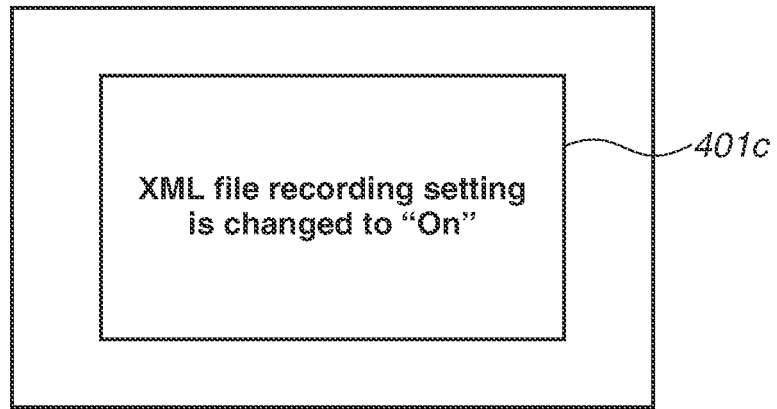

In step S605, the control unit 101 changes the XML file recording setting to "On". Subsequently, in step S606, the control unit 101 displays information for notifying the user that the XML file recording setting is changed to "On" on the display unit 106. For example, notification information 401c illustrated in FIG. 7C is displayed.

As described above, according to the first exemplary embodiment, the setting-purpose XML file can be received from the external apparatus even during recording of the moving-image file. In a case where the setting-purpose XML file is received during recording of the moving-image file, the received setting-purpose XML file is temporarily stored in the RAM 109, without setting the recording metadata based on the setting-purpose XML file at the time of reception. Subsequently, upon completion of recording of the moving-image file, the recording metadata is set based on the received setting-purpose XML file, so that the XML file can be prevented from becoming an incorrect XML file by writing of an unintended incorrect value in the XML file associated with the moving-image file being recorded.

For example, the XML file can be updated based on the setting-purpose XML file during recording of the moving-image file, but in this case, the processing for recording in the recording medium can be complicated, and the recording speed for the moving-image data can be affected. Therefore, in the present exemplary embodiment, upon completion of recording of the moving-image file, the recording metadata is set based on the received setting-purpose XML file and the recording metadata is applied to the next moving-image file. It is therefore possible to set the recording metadata based on the received setting-purpose XML file, without requiring complicated recording processing and without affecting the recording speed.

Further, upon completion of recording of the moving-image file, the setting of the recording metadata is changed, and the information for notifying the user of this change is displayed. Therefore, the user can recognize that the recording metadata after the setting change is to be recorded in recording of the next moving-image file.

A second exemplary embodiment will be described. A digital video camera 100 which is a video image recording apparatus has a configuration similar to that of the first exemplary embodiment, and thus the description thereof will be omitted.

FIG. 8 illustrates a flowchart of an XML file recording processing procedure in the present exemplary embodiment. A control unit 101 reads out a program stored in a ROM 108 and loads the read-out program into a RAM 109, thereby executing control for each of components and calculation processing, so that each step of the flowchart in FIG. 8 is implemented. Part of the processing of the flowchart in FIG. 8 is common to that of the processing of the flowchart in FIG. 5 of the first exemplary embodiment. The same step as that in the flowchart in FIG. 5 is assigned the same numeral as that in FIG. 5, and the description thereof will be omitted. As with the flowchart in FIG. 5, the processing of the flowchart in FIG. 8 starts when the digital video camera 100 is set to a camera mode (image capturing mode) by an operation on an operation unit 107 by a user. Subsequently, as with the processing in FIG. 5, in a case where XML file recording setting is "On", recording metadata corresponding to an XML file format setting selected by the user is read out from the ROM 108 and stored in the RAM 109.

Step S500 to step S503 are similar to those in the first exemplary embodiment.

In a case where the control unit 101 determines that a recording start instruction is input (YES in step S503), then in step S800, an XML file generation unit 112 generates at-start-of-recording information metadata from information that can be acquired at the start of recording, and the at-start-of-recording information metadata is temporarily stored in the RAM 109.

Afterward, step S504 to step S509 are performed in a manner similar to the first exemplary embodiment.

If the control unit 101 determines that a recording end instruction is input (YES in step S509), then in step S801, the control unit 101 determines whether a setting-purpose XML file is temporarily stored in the RAM 109 by execution of step S508. If the control unit 101 determines that the setting-purpose XML file is temporarily stored (YES in step S801), the processing proceeds to step S802. If the control unit 101 determines that the setting-purpose XML file is not temporarily stored (NO in step S801), the processing proceeds to step S806.

In step S802, the XML file generation unit 112 analyzes the setting-purpose XML file temporarily stored in the RAM 109 in step S508. Subsequently, metadata desirable for generation of an XML file to be recorded in association with a moving-image file is set as recording metadata, and the recording metadata is stored in the RAM 109. Step S801 and step S802 are similar to step S512 and step S513 of the first exemplary embodiment, but are different from the first exemplary embodiment in terms of execution timing. In the second exemplary embodiment, these steps are executed before recording of the XML file is completed.

In step S803, the XML file generation unit 112 generates at-end-of-recording information metadata from information that can be acquired at the end of recording. Using the at-start-of-recording information metadata stored in the RAM 109 in step S800, the generated at-end-of-recording information metadata, and the recording metadata set and stored in the RAM 109 in step S802, the XML file is regenerated.

In step S804, the control unit 101 deletes the XML file recorded in a recording medium 111 in step S506 via a recording medium I/F 110, and records the XML file regenerated in step S803 in the recording medium 111, thereby completing recording of the XML file.

In step S805, because the recording metadata is updated in step S802, the control unit 101 executes setting update and information display processing, which is composed of setting update processing accompanying setting change of recording metadata, and information display processing about setting change (similar to the processing in FIG. 6). The processing returns to step S500 after the execution of step S805.

In step S806, the control unit 101 determines whether the XML file recording setting is "On". If the control unit 101 determines that the setting is "On" (YES in step S806), the processing proceeds to step S807. If the control unit 101 determines that the setting is not "On" (NO in step S806), the processing returns to step S500. In step S807, the XML file generation unit 112 generates at-end-of-recording information metadata from information that can be acquired at the end of recording. Subsequently, the XML file recorded in the recording medium 111 in step S506 is read out, metadata 203 in the XML file is updated with the generated metadata, and the updated XML file is recorded in the recording medium 111. This completes recording of the XML file, and the processing returns to step S500. Step S806 and step S807 are similar to step S510 and step S511 of the first exemplary embodiment, but are different from the first exemplary embodiment in terms of execution timing.

As described above, according to the second exemplar embodiment, the setting-purpose XML file can be received from the external apparatus via a wireless communication unit 105 even during recording of the moving-image file in the digital video camera 100. In a case where the setting-purpose XML file is received during recording of the moving-image file, the setting-purpose XML file is temporarily stored, and the recording metadata is updated at the end of recording of the moving-image file (moving-image data). In addition, at the start of recording of the moving-image file, the at-start-of-recording information metadata is stored in the RAM 109. At the end of recording of the moving-image file, the XML file is regenerated, using the recording metadata in which the setting is changed by receiving the setting-purpose XML file, the at-start-of-recording information metadata stored in the RAM 109, and the at-end-of-recording information metadata acquired at the end of recording, and the regenerated XML file is recorded in the recording medium 111. Such processing makes it possible to record the XML file reflecting the metadata of the received setting-purpose XML file, as an XML file to be recorded in association with the moving-image file being recorded, even if the setting-purpose XML file is received during recording of the moving-image file.

In the present exemplary embodiment, in a case where the setting-purpose XML file is received during recording of the moving-image file, the reception timing is included in the time during which recording of the moving-image data is processed, and the processing load of the digital video camera 100 is high, and thus the recording metadata is not updated. For example, update of the recording metadata and update of the XML file can be executed based on the received setting-purpose XML file, during recording of the moving-image data, but in this case, the processing for recording in the recording medium can be complicated, and the recording speed for the moving-image data can be affected. Therefore, in the present exemplary embodiment, the recording metadata is updated (set) based on the received setting-purpose XML file, at the end of recording of the moving-image file after recording of the moving-image data is completed. It is therefore possible to perform setting of the recording metadata and update of the XML file (regeneration and recording in the recording medium) based on the received setting-purpose XML file, without requiring complicated recording processing and without affecting the recording speed. In the present exemplary embodiment, update of the recording metadata and update of the XML file are performed at the end of recording of the moving-image file. However, the recording metadata may be updated at the reception timing, even during recording of the moving-image data. However, even in this case, the XML file may be updated at the end of recording.

In a case where the entire XML file to be recorded (the XML file in the format identical to that of the XML file being recorded) is input as the setting-purpose XML file during recording of the moving-image file, the additional information file being recorded can be updated with the input setting-purpose XML file. However, if the additional information file being recorded is updated with the input setting-purpose XML file, the at-start-of-recording information metadata is overwritten, which results in the lack of the at-start-of-recording information metadata. Therefore, in the present exemplary embodiment, the at-start-of-recording information metadata is temporarily stored at the start of recording, and in a case where the setting-purpose XML file is received during recording of the moving-image file, the additional information file is regenerated using the temporarily stored at-start-of-recording information metadata, the setting-purpose additional information file, and the at-end-of-recording information metadata, at the end of recording.

Therefore, even in a case where the entire XML file is input as the setting-purpose additional information file, it is possible to reliably record the metadata, without missing the at-start-of-recording information metadata.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No, 2021-108054, filed Jun. 29, 2021, which is hereby incorporated by reference herein in its entirety.

What is claimed is:

1. A recording apparatus comprising:
an input unit configured to input additional information;
a control unit configured to set the input additional information as recording additional information to be recorded together with a moving-image file; and
a recording control unit configured to record moving-image data in a recording medium as the moving-image file, and record an additional information file including the recording additional information set by the control unit in the recording medium, in association with the moving-image file,
wherein, in a case where the additional information is input prior to recording of the moving-image file in the recording medium, the control unit sets the input additional information as the recording additional information in response to input of the additional information; and in a case where the additional information is input by the input unit during recording of the moving-image file in the recording medium, the control unit sets the input additional information as the recording additional information according to end of recording of the moving-image file, without setting the input additional information as the recording additional information in response to the input of the additional information by the input unit.

2. The recording apparatus according to claim 1, wherein, in a case where the moving-image file is not being recorded, the control unit sets the input additional information as the recording additional information in response to the input of the additional information by the input unit, and in a case where the moving-image file is being recorded, the control unit temporarily stores the input additional information, without setting the input additional information as the recording additional information in response to the input of the additional information by the input unit, and sets the input additional information as the recording additional information, at the end of recording of the moving-image file.

3. The recording apparatus according to claim 1, further comprising a display control unit configured to control a display unit to display a notification about setting of the additional information.

4. The recording apparatus according to claim 1, wherein the recording control unit records the additional information file including the recording additional information in the recording Medium, at start of recording of the moving image file, and updates information about the moving-image file, of the additional information file recorded in the recording medium, at the end of recording of the moving-image file.

5. The recording apparatus according to claim 4, wherein, at the start of recording of the moving-image file, the recording control unit records the additional information file generated from the recording additional information and first additional information determined at the start of recording of the moving-image file.

6. The recording apparatus according to claim 5,
wherein the input unit inputs from an external apparatus a file describing the additional information in a format that is a same as a format of the additional information file to be recorded in the recording medium by the recording control unit, and
wherein the file describing the additional information includes an item of the first additional information.

7. The recording apparatus according to claim 4, wherein the information about the moving-image file to be updated at the end of recording of the moving-image file is second additional information determined in response to completion of recording of the moving-image data of the moving-image file.

8. The recording apparatus according to claim 7, wherein the second additional information is information indicating a record length of the moving-image data recorded in the moving-image file.

9. The recording apparatus according to claim 1, wherein, in a case where the additional information is input by the input unit during recording of the moving-image data in the recording medium, the control unit sets the input additional information as the recording additional information upon completion of recording of the moving-image file, in order to record the additional information file including the input additional information together with a moving image file to be recorded next.

10. The recording apparatus according to claim 1,
wherein, at start of recording of the moving-image file, the recording control unit generates the additional information file, based on the recording additional information set by the control unit, and first additional information determined at the start of recording of the moving-image file, records the generated additional information file in the recording medium, and temporarily stores the first additional information, wherein, in a case where the additional information is input by the input unit during recording of the moving-image file in the recording medium, the recording control unit regenerates the additional information file based on the input additional information, the first additional information temporarily stored, and second additional information determined at completion of recording of the moving-image data of the moving-image file, at the end of recording of the moving-image file, and records the regenerated additional information file in the recording medium, and the control unit sets the input additional information as the recording additional information, and wherein, in a case where the additional information is not input by the input unit during recording of the moving-image file in the recording medium, the recording control unit updates the additional information file recorded in the recording medium, using the second information, at the end of recording of the moving-image file.

11. The recording apparatus according to claim 1, further comprising a setting unit configured to set whether to record the additional information file, wherein the setting unit changes to a setting for recording the additional information file, in response to the input of the additional information by the input unit not during recording of the moving-image file.

12. The recording apparatus according to claim 11, wherein, in a case where the additional information is input by the input unit during recording of the moving-image file, the setting unit changes to the setting for recording the additional information file, upon completion of recording of the moving-image file.

13. The recording apparatus according to claim 1, further comprising a setting unit configured to set whether to record the additional information file, wherein, in a case where the additional information is input by the input unit during recording of the moving-image file, the recording control unit records the additional information file including the input additional information in the recording medium, regardless of a setting by the setting unit.

14. The recording apparatus according to claim 1, wherein the input unit is a reception unit configured to receive additional information transmitted from an external apparatus, and wherein the control unit sets the received additional information as the recording additional information, in response to receipt of the additional information by the reception unit.

15. The recording apparatus according to claim 1, wherein, in a case where a setting-purpose additional information file describing the additional information in a format that is a same as a format of the additional information file to be recorded in association with the moving-image file is input by the input unit during recording of the moving-image file in the recording medium, the control unit sets the input additional information as the recording additional information, at the end of recording of the moving-image file.

16. The recording apparatus according to claim 1, wherein the additional information file is a file in an Extensible Markup Language (XML) format.

17. The recording apparatus according to claim 16, wherein the additional information file is a file in a NewsML-G2 format.

18. The recording apparatus according to claim 1, further comprising an imaging unit, wherein the recording control unit records moving-image data acquired by the imaging unit, as the moving-image file.

19. A control method of a recording apparatus, the control method comprising:

inputting additional information;

setting the input additional information as recording additional information to be recorded together with a moving-image file; and performing recording control to record moving-image data in a recording medium as the moving-image file, and record an additional information file including the set recording additional information in the recording medium, in association with the moving-image file, wherein, in a case where the additional information is input prior to recording of the moving-image file in the recording medium, the input additional information is set as the recording additional information in response to input of the additional information; and in a case where the additional information is input during recording of the moving-image file in the recording medium, the input additional information is set as the recording additional information according to end of recording of the moving-image file, without setting of the input additional information as the recording additional information in response to the input of the additional information.

20. A non-transitory computer-readable storage medium storing a program for causing a computer to execute the control method according to claim 19.

* * * * *